(12) United States Patent
Higuchi

(10) Patent No.: US 6,668,131 B2
(45) Date of Patent: Dec. 23, 2003

(54) TAPE END DETECTOR AND VIDEO CASSETTE REPRODUCING APPARATUS

(75) Inventor: Yoshio Higuchi, Osaka (JP)

(73) Assignee: Fubai Electric Co., Ltd., Osaka (JP)

( * ) Notice: Subject to any disclaimer, the term of this patent is extended or adjusted under 35 U.S.C. 154(b) by 0 days.

(21) Appl. No.: 09/415,051

(22) Filed: Oct. 7, 1999

(65) Prior Publication Data

US 2002/0041751 A1 Apr. 11, 2002

(30) Foreign Application Priority Data

Oct. 8, 1998 (JP) ........................ 10-007864 U

(51) Int. Cl.⁷ ................................ H04N 5/76
(52) U.S. Cl. .................. 386/46; 360/74.6; 242/333; 242/333.1
(58) Field of Search .............. 386/1, 46; 360/59, 360/71, 74.1, 74.5, 74.6, 137; 242/333, 333.1, 333.2, 333.3, 333.4, 333.5, 333.6, 333.7; H04N 5/76, 9/79, 5/781

(56) References Cited

U.S. PATENT DOCUMENTS 4,138,698 A * 2/1979 Kokei ........................ 360/74.6
6,459,541 B1 * 10/2002 Minabe et al. ............ 360/74.6

FOREIGN PATENT DOCUMENTS

| JP | 61-80541 | * 4/1986 | .................. 360/137 |
| JP | 5-290446 | * 11/1993 | .................. 360/71 |

* cited by examiner

*Primary Examiner*—Thai Tran
(74) *Attorney, Agent, or Firm*—Lackenbach Siegel, LLP; Myron Greenspan

(57) ABSTRACT

A tape end detector includes a first resistor connected between a positive power source and an analog input terminal, a second resistor connected between the analog input terminal and the ground, a first phototransistor the collector of which is connected to an output terminal and the emitter of which is connected to the analog input terminal, and a second phototransistor the collector of which is connected to the analog input terminal and the emitter of which is connected to the output terminal. In the tape end detector, it is determined based upon voltage applied to the analog input terminal when the output terminal is at a high level whether the first phototransistor is turned on or off and it is determined based upon voltage applied to the analog input terminal when the output terminal is at a low level whether the second phototransistor is turned on or off.

5 Claims, 3 Drawing Sheets

TAPE END DETECTOR AND VIDEO CASSETTE REPRODUCING APPARATUS

BACKGROUND OF THE INVENTION

1. Field of the Invention

The present invention relates to a tape end detector for detecting a tape end by detecting difference between the optical transmissivity of a transparent tape leader and the optical transmissivity of a magnetic substance applied part using phototransistors, and a video cassette reproducing apparatus provided with the above tape end detector.

2. Description of the Related Art

In a video cassette deck, a phototransistor is used to detect a transparent leader at a tape end, however, the phototransistor receives light weak in intensity in relationship with an optical path. As a result, the phototransistor does not become a saturated state even if it receives light. Therefore, the phototransistor for detecting a tape end cannot be used for a switch for transferring its state between two states of an ON state and an OFF state. Therefore, output from the phototransistor is required to be dealt as an analog signal and two types of analog input composed of analog input for a phototransistor for detecting a tape end on the side of a take-up reel and analog input for a phototransistor for detecting a tape end on the side of a supply reel are required. However, as the two types of analog input are required in the case of the above configuration, the configuration of a microcomputer becomes complicated.

Technique to solve the above problem is proposed in Japanese Utility Model Registered Publication No. 3055795. That is, the voltage of a positive power source is divided by a voltage dividing circuit composed of a first resistor and a second resistor. The first phototransistor for detecting a tape end on the side of the take-up reel is connected to the first resistor in parallel. The second phototransistor for detecting a tape end on the side of the supply reel is connected between a divided voltage output point of the voltage dividing circuit and a direction output terminal of a microcomputer. Therefore, when the direction output terminal of the microcomputer is at a low level, three types of states of a state in which only the first phototransistor is turned on, a state in which the first and second phototransistors are both turned off and a state in which only the second phototransistor is turned on can be discriminated only by detecting voltage at the divided voltage output point.

However, if the above configuration is used, the following problems occur. That is, even if a phototransistor receives beams equal in intensity, a value of resistance between the collector and the emitter of the phototransistor greatly varies due to dispersion between the characteristics of the phototransistors. As for the optical transmissivity of a transparent leader of a video tape, 50% or more meets a standard value and as to the optical transmissivity of a magnetic substance applied part, 1.5% or less meets a standard value. Therefore, if the dispersion of optical transmissivity and the dispersion between the characteristics of phototransistors are synergistic, difference between a value of resistance between the collector and the emitter when light transmitted through the tape leader is received (at on time) and a value of resistance between the collector and the emitter when light transmitted through the magnetic substance applied part is received (at off time) is double or less as ratio.

Therefore, a range of the dispersion of voltage at the divided voltage output point in case the phototransistor on the side of the take-up reel and the phototransistor on the side of the supply reel are both turned off overlaps with a range of the dispersion of voltage at the divided voltage output terminal when one phototransistor is turned on. Therefore, an error may occur in discriminating two types of states of a case that two phototransistors are both turned off and a case that one phototransistor is turned on. To prevent such an error in discrimination, it is required that the above two types of ranges of dispersion are not overlapped and it is enabled by selecting and using phototransistors equal in characteristics. However, if a phototransistor is selected and used, the price of the phototransistor is increased.

SUMMARY OF THE INVENTION

The present invention was made to solve the above problems and an object of the present invention is to provide a tape end detector wherein a tape end can be detected without increasing the number of output terminals of a microcomputer and without an error even when elements large in dispersion between characteristics are used.

To achieve the above object, according to the present invention, there is provided a tape end detector for detecting a tape end based upon difference between an optical transmissivity of a tape leader and an optical transmissivity of a magnetic substance applied part, comprising: a first resistor one terminal of which is connected to a positive power source; a second resistor one terminal of which is connected to the other terminal of the first resistor and the other terminal of which is grounded; a microcomputer to the analog input terminal of which the other terminal of the first resistor is connected; a first phototransistor the collector of which is connected to the output terminal of the microcomputer and the emitter of which is connected to the other terminal of the first resistor for detecting one tape end on the side of a take-up reel or on the side of a supply reel; and a second phototransistor the collector of which is connected to one terminal of the second resistor and the emitter of which is connected to the output terminal of the microcomputer for detecting the other tape end on the side of the take-up reel or on the side of the supply reel, wherein the microcomputer determines whether the first phototransistor is turned on or off based upon voltage applied to the analog input terminal when the output terminal is at a high level, and determines whether the second phototransistor is turned on or off based upon voltage applied to the analog input terminal when the output terminal is at a low level.

That is, when the output terminal is at a high level, voltage applied to the analog input terminal depends upon only a value of resistance between the collector and the emitter of the first phototransistor and is not influenced by the second phototransistor. When the output terminal is at a low level, voltage applied to the analog input terminal depends upon only a value of resistance between the collector and the emitter of the second phototransistor and is not influenced by the first phototransistor. That is, a state in which the first phototransistor receives light and a state in which the second phototransistor receives light are individually determined by one output terminal the level of which can be changed to a high level and a low level and one analog input terminal without being influenced by the other phototransistor.

DETAILED DESCRIPTION OF THE PREFERRED EMBODIMENTS

Figure 1:
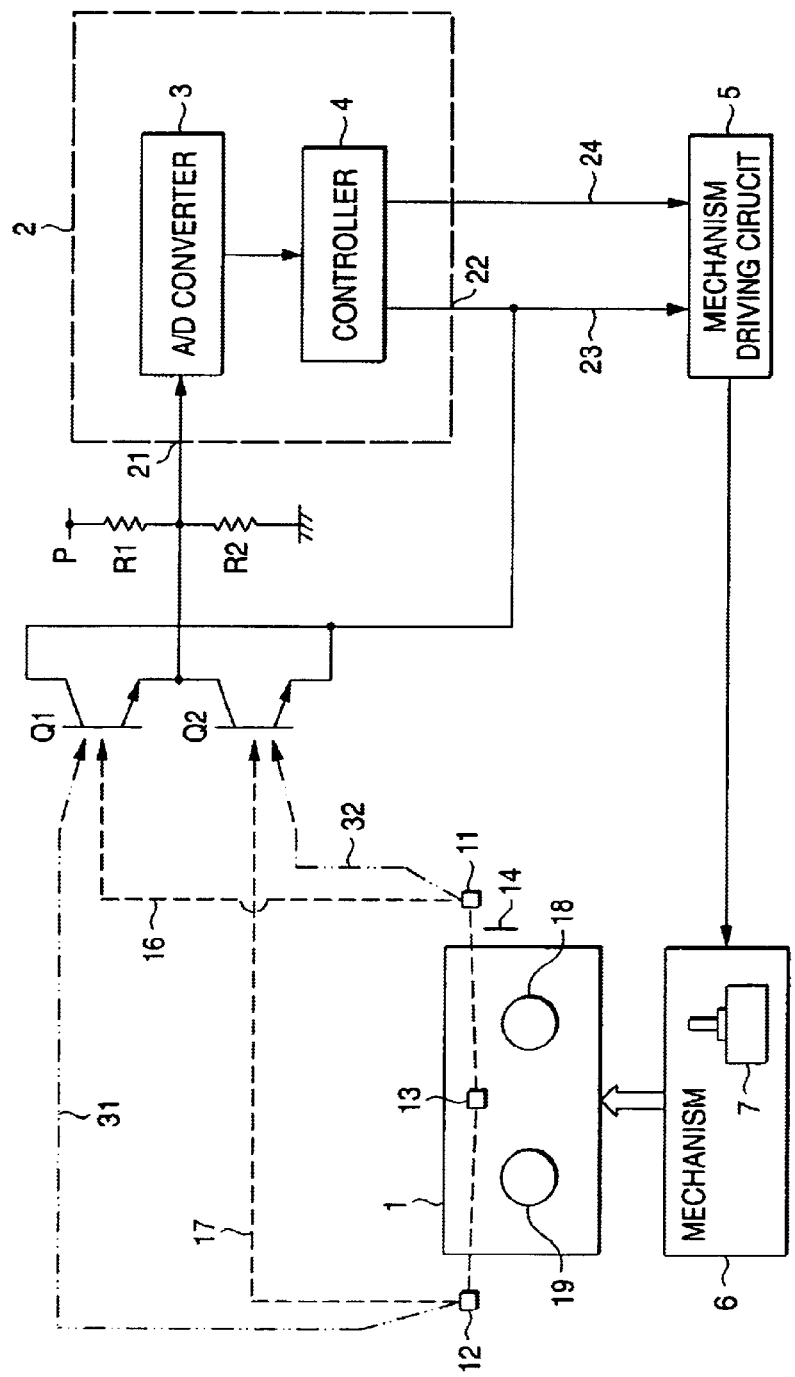
FIG. 1 is a block diagram showing the electrical configuration of a tape running device to which an embodiment of a tape end detector according to the present invention is applied.

Referring to the drawings, embodiments of the present invention will be described below.

FIG. 1 is a block diagram showing the electrical configuration of a tape running device of a video cassette deck to which a first embodiment of a tape end detector according to the present invention is applied. A block 2 shown by a broken line designates a microcomputer for executing main control.

As shown in FIG. 1, a mechanism 6 is composed by a block provided with a loading motor (not shown) for loading a tape cassette 1, a capstan motor 7 and others and loads the tape cassette 1 inserted into a slot (not shown) provided to the body of the deck. When the tape cassette 1 is loaded into a predetermined position, the mechanism 6 also loads a video tape in the tape cassette 1. The mechanism 6 also runs the video tape.

A mechanism driving circuit 5 drives the mechanism 6 according to direction indicating output 23 sent from a direction output terminal 22 of a microcomputer 2 and control output 24. That is, when the control output 24 instructs rotation while the direction indicating output 23 is at a low level, the video tape is run to the side of a take-up reel 18 by rotating the capstan motor in a direction of normal rotation. When the control output 24 instructs rotation while the direction indicating output 23 is at a high level, the video tape is run to the side of a supply reel 19 by reversing the capstan motor 7.

A first phototransistor Q1 for receiving light led via a prism 11 and a second phototransistor Q2 for receiving light led via a prism 12 are provided in the respective vicinities of sides of the tape cassette 1 loaded into the predetermined position.

In detail, a broken line 16 shows an optical path for detecting a tape end on the side of the take-up reel 18. That is, light emitted toward the side of the take-up reel 18 from a prism 13 is reflected by the prism 11 after the light is transmitted inside the tape cassette 1 and is led to the first phototransistor Q1. Also, a broken line 17 shows an optical path for detecting a tape end on the side of the supply reel 19. That is, light emitted toward the side of the supply reel 19 from the prism 13 is reflected by the prism 12 after the light is transmitted inside the tape cassette 1 and is led to the second phototransistor Q2. Therefore, when a transparent tape leader comes in a detection position on the side of the take-up reel 18, the first phototransistor Q1 receives light. Also, when a transparent tape leader comes in a detection position on the side of the supply reel 19, the second phototransistor Q2 receives light (optical paths shown by two-dot chain lines 31 and 32 will be described later).

A shielding plate 14 is provided in the vicinity of the prism 11 composing the optical path for detecting a tape end on the side of the take-up reel 18. The shielding plate 14 is a movable plate which is moved to a position in which an optical path from the prism 13 to the prism 11 is shielded when the tape cassette 1 is inserted into the slot provided to the body of the deck (not shown) and returned to an initial position in which the optical path is not shielded when the tape cassette 1 is loaded into the predetermined position. Therefore, the first phototransistor Q1 detects a tape end on the side of the take-up reel 18 and also detects the insertion of the tape cassette 1.

A first resistor R1 and a second resistor R2 function as a voltage dividing circuit for dividing the voltage of a positive power source P (equal to the source voltage of the microcomputer 2). Therefore, one terminal of the first resistor R1 is connected to the positive power source P. One terminal of the second resistor R2 is connected to the other terminal of the first resistor R1 and the other terminal of the second resistor R2 is grounded. A connection at which the other terminal of the first resistor R1 and one terminal of the second resistor R2 are connected is led to an A/D converter 3 via an analog input terminal 21 of the microcomputer 2.

The collector of the first phototransistor Q1 for detecting a tape end on the side of the take-up reel 18 is connected to the direction output terminal 22 which is a digital output terminal of the microcomputer 2 and from which the direction indicating output 23 is sent. The emitter of the first phototransistor Q1 is connected to the other terminal of the first resistor R1. The collector of the second phototransistor Q2 for detecting a tape end on the side of the supply reel 19 is connected to one terminal of the second resistor R2 and the emitter is connected to the direction output terminal 22.

The A/D converter 3 converts voltage led to the analog input terminal 21 to a digital value and sends the digital value to a controller 4. The controller 4 controls the main operation of the video cassette deck. Therefore, the controller sends the direction indicating output 23 for indicating the rotational direction of the capstan motor 7 and the control output 24 for instructing the rotation and the stop of the capstan motor 7 to the mechanism driving circuit 5 (outputs for the other instructions are not shown). The controller controls the operation of the mechanism 6 via the mechanism driving circuit 5 according to the result of determination based upon the output of the A/D converter 3.

As described above, the prism 13 is provided on the side of emission and the prisms 11 and 12 are provided on the side of reception respectively on the optical paths 16 and 17 to refract each optical path perpendicularly. Therefore, the first phototransistor Q1 and the second phototransistor Q2 both receive light weak in intensity. The optical transmissivity of a leader of the video tape in the tape cassette 1 is 50% at the worst value (the minimum value). The optical transmissivity of a magnetic substance applied part of the video tape is 1.5% at the worst value (the maximum value). There is large dispersion between the characteristics of the first and second phototransistors Q1 and Q2.

Therefore, a value of resistance between the collector and the emitter of the first and second phototransistors Q1 and Q2 is as follows. That is, the value of the above resistance when the magnetic substance applied part is located on the optical path is 560 kΩ (the minimum value) in the worst case. The value of the above resistance when the tape leader is located on the optical path is 330 kΩ (the maximum value) in the worst case. Therefore, if the worst value is used for a reference value to guarantee secure operation, the first and second phototransistors Q1 and Q2 are required to be regarded as an OFF state when the value of the above resistance is 560 kΩ or more and the first and second phototransistors Q1 and Q2 are required to be regarded as an ON state when the value of the above resistance is 330 kΩ or less.

Figure 3:
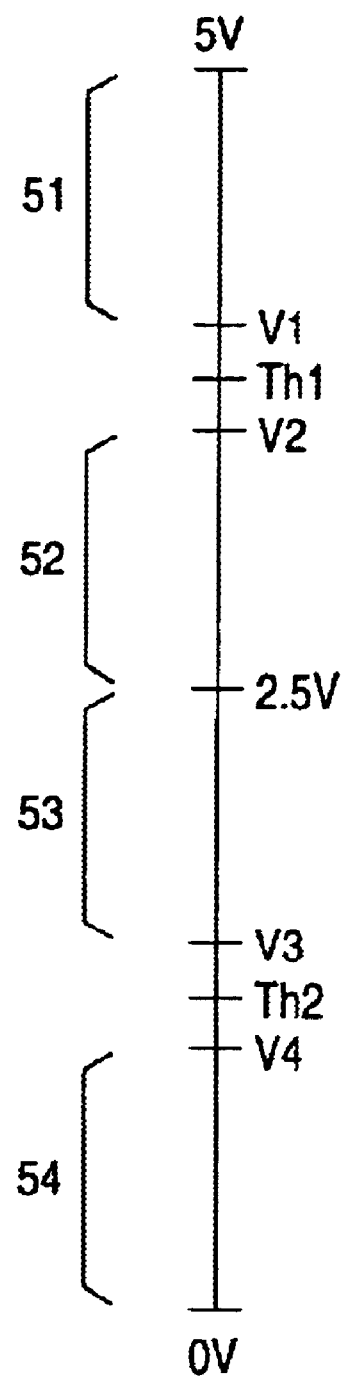
FIG. 3 is an explanatory diagram showing relationship between voltage applied to an analog input terminal and voltage as a criterion.

In the meantime, as current does not flow in the second phototransistor Q2 when the direction output terminal 22 is at a high level, the second phototransistor Q2 can be ignored. Therefore, voltage applied to the analog input terminal 21 depends upon only the value of resistance between the collector and the emitter of the first phototransistor Q1. Each value of the first resistor R1 and the second resistor R2 is 1 MΩ. Therefore, when the first phototransistor Q1 is turned on, voltage in a range 51 from 3.95 V (V1 in FIG. 3) to 5 V is applied to the analog input terminal 21. When the first phototransistor Q1 is turned off, voltage in a range 52 from 2.5 V to 3.60 V (V2 in FIG. 3) is applied to the analog input terminal 21.

In the meantime, as current does not flow in the first phototransistor Q1 when the direction output terminal 22 is at a low level, the first phototransistor Q1 can be ignored. Therefore, voltage applied to the analog input terminal 21 depends upon only the value of resistance between the collector and the emitter of the second phototransistor Q2. Therefore, when the second phototransistor Q2 is turned off, voltage in a range 53 from 1.31 V (V3 in FIG. 3) to 2.5 V is applied to the analog input terminal 21. When the second phototransistor Q2 is turned on, voltage in a range 54 from 0 V to 0.97 V (V4 in FIG. 3) is applied to the analog input terminal 21.

The controller 4 stores voltage Th1 which is a median value between voltage V1 and voltage V2 and voltage Th2 which is a median value between voltage V3 and voltage V4 respectively as reference values beforehand. If the output of the A/D converter 3 is higher than the voltage Th1 while the direction output terminal 22 is at a high level, the controller determines that the first phototransistor Q1 is turned on. That is, the controller determines that the tape leader comes in the detection position on the side of the take-up reel 18. If the output of the A/D converter 3 is lower than the voltage Th1, the controller determines that the first phototransistor Q1 is turned off. That is, the controller determines that the magnetic substance applied part comes in the detection position on the side of the take-up reel 18.

If the output of the A/D converter 3 is lower than the voltage Th2 while the direction output terminal 22 is at a low level, the controller 4 determines that the second phototransistor Q2 is turned on. That is, the controller determines that the tape leader comes in the detection position on the side of the supply reel 19. If the output of the A/D converter 3 is higher than the voltage Th2, the controller determines that the second phototransistor Q2 is turned off. That is, the controller determines that the magnetic substance applied part comes in the detection position on the side of the supply reel 19.

The controller 4 executes the following operation after the tape cassette 1 is ejected. That is, the controller checks whether the first phototransistor Q1 is turned on or off by changing the direction output terminal 22 to a high level and as the tape cassette 1 is inserted into the slot when the first phototransistor is turned off, the controller determines that the shielding plate 14 shields the optical path. When the controller determines that the shielding plate 14 shields the optical path, the controller controls so that the inserted tape cassette 1 is loaded into the predetermined position.

Figure 2:
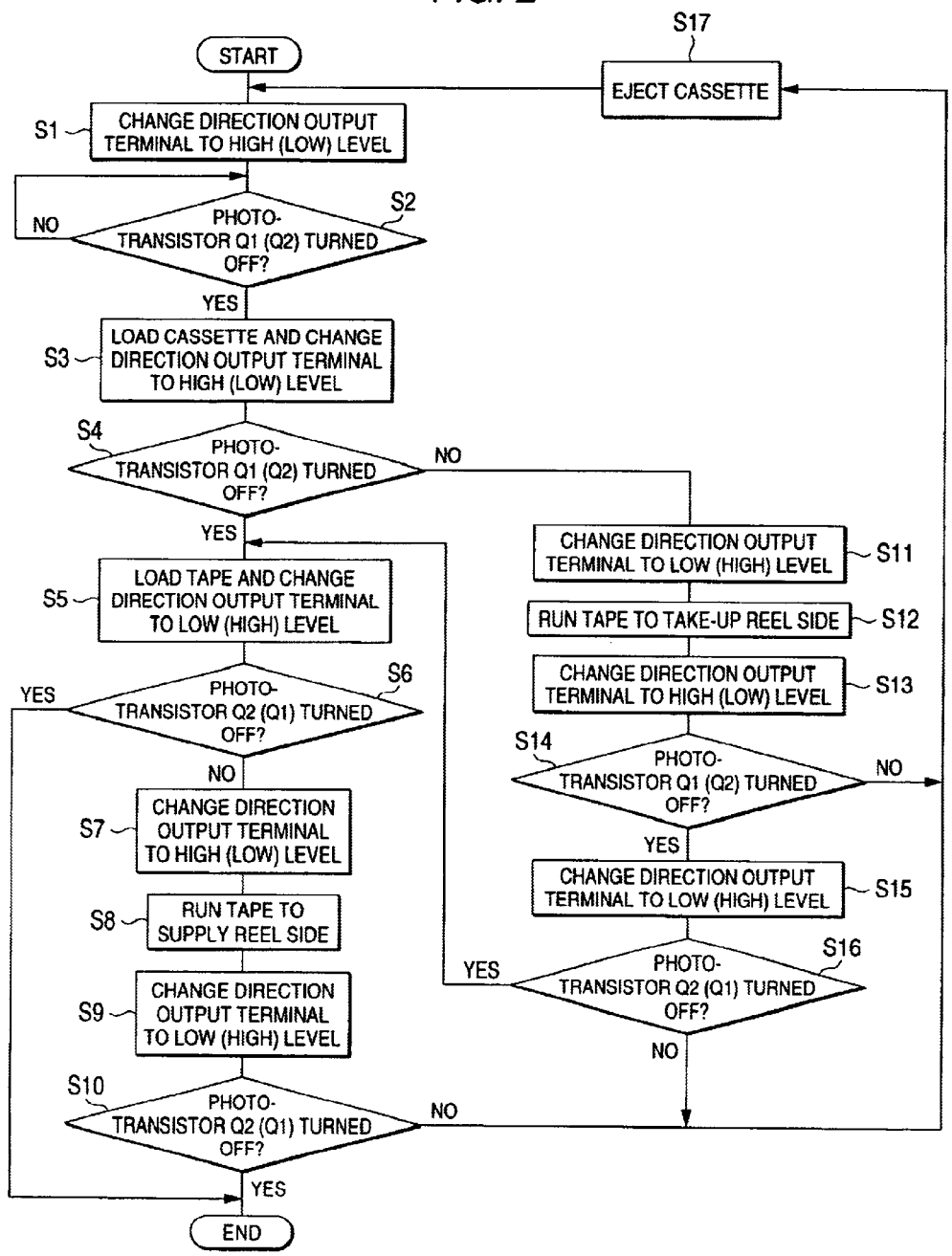
FIG. 2 is a flowchart showing initial operation in this embodiment.

FIG. 2 is a flowchart showing initial operation in this embodiment. Referring to FIG. 2 if necessary, the operation of this embodiment will be described below. Description in parentheses will be described in detail later.

In an initial state in which the tape cassette 1 is ejected and the insertion of the next tape cassette 1 is awaited, the shielding plate 14 is moved to an initial position in which the shielding plate does not shield the optical path. Therefore, the first and second phototransistors Q1 and Q2 both receive light. In this state, the controller 4 checks whether the first phototransistor Q1 is turned on or off by setting the direction output terminal 22 to a high level. If the tape cassette 1 is not inserted, the output of the A/D converter 3 is in the range 51 of voltage and it shows that the first phototransistor Q1 is turned on (steps S1 and S2).

In the meantime, as the shielding plate 14 shields the optical path when the tape cassette 1 is inserted, the output of the A/D converter 3 is in the range 52 of voltage and it shows that the first phototransistor Q1 is turned off. Therefore, when the first phototransistor Q1 is turned off, the controller 4 determines that the tape cassette 1 is inserted into the slot and controls so that the tape cassette 1 is loaded. When the tape cassette 1 is loaded into the predetermined position, the shielding plate 14 is returned to the initial position and is located off the optical path. As a result, succeedingly, the first phototransistor Q1 is turned on in case the tape leader comes in the detection position on the side of the take-up reel 18 and is turned off in case the magnetic substance applied part comes in the detection position. Therefore, the controller 4 changes the direction output terminal 22 to a high level after the tape cassette 1 is loaded into the predetermined position and determines whether the first phototransistor Q1 is turned on or off (steps S3 and S4).

As the tape leader comes in the detection position on the side of the take-up reel 18 in case the first phototransistor Q1 is turned on, the controller 4 transfers control from step S4 to step S11 and controls so that the video tape is run to the side of the take-up reel 18. That is, the controller changes the direction indicating output 23 (the direction output terminal 22) to a low level so as to change the rotational direction of the capstan motor 7 to the direction of normal rotation. The controller also sends output indicating the rotation of the capstan motor 7 as the control output 24. Therefore, the video tape is run toward the side of the take-up reel 18 only for a fixed period (steps S11 and S12).

When control for running the video tape only for the fixed period is finished, the controller 4 changes the direction output terminal 22 to a high level so as to determine whether the first phototransistor Q1 is turned on or off. In this state, the controller determines based upon the output of the A/D converter 3 whether the first phototransistor Q1 is turned on or off (steps S13 and S14). In the meantime, distance by which the video tape is run in step S11 is longer than the length of the tape leader. Therefore, in the determination in step S14, the magnetic substance applied part is to come in the detection position on the side of the take-up reel 18 and the first phototransistor Q1 is to be turned off.

If it is determined in step S14 that the first phototransistor Q1 is turned on, the controller 4 judges that the inserted tape cassette 1 is a tape cassette 1 in which a problem occurs or is blank and ejects the tape cassette 1 (step S17). Afterward, the controller restores control to the initial state in which the insertion of a tape cassette 1 is awaited. In the meantime, if it is determined in step S14 that the first phototransistor Q1 is turned off, the controller 4 checks whether the video tape can be fed from the side of the supply reel 19 or not. This is because the video tape is required to be fed from the side of the supply reel 19 when the tape is loaded.

Therefore, the controller 4 changes the direction output terminal 22 to a low level and determines whether the second phototransistor Q2 is turned on or off (steps S15 and S16). At this time, the magnetic substance applied part is required to come in the detection position on the side of the supply reel 19. That is, the second phototransistor Q2 is required to be turned off and if the second phototransistor is turned on, it means that an error occurs in the tape cassette 1. Therefore, if it is determined in step S16 that the second phototransistor Q2 is turned on, the controller 4 ejects the tape cassette 1 (step S17). In the meantime, if it is determined in step S16 that the second phototransistor Q2 is turned off, the controller 4 transfers control from step S16 to step S5.

In step S5, the controller 4 controls so that the video tape is loaded. The controller determines whether the second phototransistor Q2 is turned on or off by changing the direction output terminal 22 to a low level so as to check whether the tape leader comes in the detection position on the side of the supply reel 19 or not after loading (step S6). When the magnetic substance applied part comes in the detection position on the side of the supply reel 19 at this time, the second phototransistor Q2 is turned off. Therefore, if it is determined in step S6 that the second phototransistor Q2 is turned off, the initial operation is finished.

However, if the tape leader comes in the detection position on the side of the supply reel 19, the second phototransistor Q2 is turned on. Therefore, if it is determined in step S6 that the second phototransistor Q2 is turned on, the controller 4 controls so that the video tape is rewound by predetermined length. That is, the controller sets the rotational direction of the capstan motor 7 to the direction of reverse rotation by changing the direction indicating output 23 (the direction output terminal 22) to a high level (step S7). The controller also rotates the capstan motor 7 only for fixed time using the control output 24. As a result, the video tape is run toward the side of the supply reel 19 by fixed distance (step S8).

When the above operation is finished, the controller determines whether the second phototransistor Q2 is turned on or off by changing the direction output terminal 22 to a low level. If the controller confirms that the second phototransistor Q2 is turned off, that is, that the magnetic substance applied part comes in the detection position on the side of the supply reel 19, the controller finishes the initial operation (steps S9 and S10). However, if it is determined in step S10 that the second phototransistor Q2 is turned on, it means that an error occurs in the tape cassette 1. Therefore, the controller 4 transfers control from step S10 to step S17 and ejects the tape cassette 1.

In the meantime, in step S4 for checking whether the tape leader comes in the detection position on the side of the take-up reel 18 or not after the tape cassette 1 is loaded into the predetermined position, if the tape leader does not come, the video tape is not required to be run to the side of the take-up reel 18. Therefore, the controller 4 transfers control to step S5 in case it is determined in step S4 that the first phototransistor Q1 is turned off.

Prior to proceeding to step S5, if the tape leader comes in the detection position on the side of the supply reel 19, the controller 4 controls so that the video tape is run to the side of the supply reel 19 by predetermined distance (the above operation is omitted in FIG. 2). Next, the video tape is loaded, however, as the succeeding operation is the same as the operation already described, the description is omitted.

When the video tape is run by changing the direction indicating output 23 to a low level in normal operation after the initial operation is finished, the video tape is run from the side of the supply reel 19 to the side of the take-up reel 18 (in reproducing operation, fast forward operation or others). Therefore, the tape leader comes in the detection position on the side of the supply reel 19. In the meantime, when the direction indicating output 23 (the direction output terminal 22) is at a low level, it can be determined whether the second phototransistor Q2 is turned on or off. Therefore, when the second phototransistor Q2 is turned on in case the video tape is run by changing the direction indicating output 23 to a low level, the controller 4 determines that the tape leader comes in the detection position on the side of the supply reel 19 and stops running.

When the video tape is run by changing the direction indicating output 23 to a high level, the video tape is run from the side of the take-up reel 18 to the side of the supply reel 19 (in backward search operation, rewinding operation or others). Therefore, the tape leader comes in the detection position on the side of the take-up reel 18. In the meantime, when the direction indicating output 23 is at a high level, it can be determined whether the first phototransistor Q1 is turned on or off. Therefore, when the first phototransistor Q1 is turned on in case the video tape is run by changing the direction output terminal 22 to a high level, the controller 4 determines that the tape leader comes in the detection position on the side of the take-up reel 18 and stops running.

A tape running device to which a second embodiment of the tape end detector according to the present invention is applied will be described below. As the electrical configuration of the second embodiment resembles the configuration shown in FIG. 1, difference between the electrical configuration in the first embodiment and that in the second embodiment will be described below.

Light refracted by a prism 12 is led to a first phototransistor Q1 via an optical path 31 shown by a two-dot chain line. Light refracted by a prism 11 is led to a second phototransistor Q2 via an optical path 32 shown by a two-dot chain line. A controller 4 determines whether a tape leader comes in a detection position on the side of a supply reel 19 or not based upon whether the first phototransistor Q1 is turned on or off and determines whether a tape leader comes in a detection position on the side of a take-up reel 18 or not based upon whether the second phototransistor Q2 is turned on or off. The controller determines whether a tape cassette 1 is inserted into the slot or not based upon whether the second phototransistor Q2 is turned on or off.

A mechanism driving circuit 5 runs a video tape in a direction reverse to the direction in the first embodiment. That is, when direction indicating output 23 is at a low level, the video tape is run from the side of the take-up reel 18 to the side of the supply reel 19 by rotating a capstan motor 7 in the direction of reverse rotation. When the direction indicating output 23 is at a high level, the video tape is run from the side of the supply reel 19 to the side of the take-up reel 18 by rotating the capstan motor 7 in the direction of normal rotation.

The flow of initial operation in the second embodiment is shown by description in the parentheses in the flowchart shown in FIG. 2. That is, in steps S2, S4 and S14, it is checked whether the second phototransistor Q2 is turned on or off. In steps S6, S10 and S16, it is checked whether the first phototransistor Q1 is turned on or off. In steps S1, S3, S7 and S13, a direction output terminal 22 is set to a low level. In steps S5, S9, S11 and S15, the direction output terminal 22 is set to a high level.

That is, the operation of the second embodiment is similar to the operation of the first embodiment except the above difference. Therefore, the detailed description of the initial operation of the second embodiment is omitted.

If the direction indicating output 23 is at a high level in normal operation after initial operation is finished, the video tape is run from the side of the supply reel 19 to the side of the take-up reel 18. Therefore, the tape leader comes in the detection position on the side of the supply reel 19. In the meantime, when the direction indicating output 23 is at a high level, it can be determined whether the first phototransistor Q1 is turned on or off. Therefore, when the first phototransistor Q1 is turned on in case the video tape is run by changing the direction indicating output 23 to a high level, the controller 4 judges that the tape leader comes in-the detection position on the side of the supply reel 19 and stops the running of the video tape.

If the direction indicating output 23 is at a low level, the video tape is run from the side of the take-up reel 18 to the side of the supply reel 19. Therefore, the tape leader comes in the detection position on the side of the take-up reel 18. In the meantime, when the direction indicating output 23 is at a low level, it can be determined whether the second phototransistor Q2 is turned on or off. Therefore, when the second phototransistor Q2 is turned on in case the video tape is run by changing the direction indicating output 23 to a low level, the controller 4 judges that the tape leader comes in the detection position on the side of the take-up reel 18 and stops the running of the video tape.

The present invention is not limited to the above embodiments and a shielding plate 14 may be provided to a position in which an optical path from a prism 13 to a prism 12 is shielded though the shielding plate is provided to the position in which the optical path from the prism 13 to the prism 11 is shielded.

The tape end detector according to the present invention includes a first resistor one terminal of which is connected to a positive power source; a second resistor one terminal of which is connected to the other terminal of the first resistor and the other terminal of which is grounded; a microcomputer to the analog input terminal of which the other terminal of the first resistor is connected; a first phototransistor the collector of which is connected to the output terminal of the microcomputer and the emitter of which is connected to the other terminal of the first resistor for detecting one tape end on the side of a take-up reel or on the side of a supply reel; and a second phototransistor the collector of which is connected to one terminal of the second resistor and the emitter of which is connected to the output terminal of the microcomputer for detecting the other tape end on the side of the take-up reel or on the side of the supply reel, wherein the microcomputer determines whether the first phototransistor is turned on or off based upon voltage applied to the analog input terminal when the output terminal is at a high level, and determines whether the second phototransistor is turned on or off based upon voltage applied to the analog input terminal when the output terminal is at a low level. Therefore, when the output terminal is at a high level, voltage applied to the analog input terminal depends upon only a value of resistance between the collector and the emitter of the first phototransistor and when the output terminal is at a low level, voltage applied to the analog input terminal depends upon only a value of resistance between the collector and the emitter of the second phototransistor. Therefore, a tape end can be detected without increasing the number of output terminals of the microcomputer and without an error even when elements large in dispersion between the characteristics are used.

What is claimed is:

1. A tape end detector for detecting a tape end based upon difference between an optical transmissivity of a tape leader and an optical transmissivity of a magnetic substance applied part, comprising:
    a first resistor one terminal of which is connected to a positive power source;
    a second resistor one terminal of which is connected to the other terminal of said first resistor and the other terminal of which is grounded;
    a microcomputer to the analog input terminal of which the other terminal of said first resistor is connected;
    a first phototransistor the collector of which is connected to the output terminal of said microcomputer and the emitter of which is connected to the other terminal of said first resistor for detecting one tape end on the side of a take-up reel or on the side of a supply reel; and
    a second phototransistor the collector of which is connected to one terminal of said second resistor and the emitter of which is connected to the output terminal of said microcomputer for detecting the other tape end on the side of the take-up reel or on the side of the supply reel,
    wherein said microcomputer determines whether said first phototransistor is turned on or off based upon voltage applied to the analog input terminal when the output terminal is at a high level, and determines whether said second phototransistor is turned on or off based upon voltage applied to the analog input terminal when the output terminal is at a low level.

2. The tape end detector according to claim 1, wherein the output terminal is a direction output terminal for controlling a direction where a tape is run, the tape is run from the side of the supply reel to the side of the take-up reel when the direction output terminal is at a low level and the tape is run from the side of the take-up reel to the side of the supply reel when the direction output terminal is at a high level, and wherein said first phototransistor detects a tape end on the side of the take-up reel, and said second phototransistor detects a tape end on the side of the supply reel.

3. The tape end detector according to claim 1, wherein the output terminal is a direction output terminal for controlling a direction where a tape is run, the tape is run from the side of the supply reel to the side of the take-up reel when said direction output terminal is at a high level and the tape is run from the side of the take-up reel to the side of the supply reel when the direction output terminal is at a low level, and wherein said first phototransistor detects a tape end on the side of the supply reel, and said second phototransistor detects a tape end on the side of the take-up reel.

4. The tape end detector according to claim 1, wherein a shielding plate that shields an optical path to said first phototransistor or said second phototransistor when a tape cassette is inserted into a slot and that does not shield the optical path when the tape cassette is loaded into a predetermined position is provided.

5. A video cassette reproducing apparatus, comprising the tape end detector according to claim 1.

* * * * *